Patented June 14, 1938

2,120,513

UNITED STATES PATENT OFFICE 2,120,513

MANUFACTURE OF NITROGENOUS CELLULOSE DERIVATIVES

Richard Stahn, Dessau, Germany, assignor to I. G. Farbenindustrie Aktiengesellschaft, Frankfort-on-the-Main, Germany No Drawing. Application August 8, 1935, Serial No. 35,401. In Germany August 14, 1934

7 Claims. (Cl. 260—152)

My present invention relates to the manufacture of cellulose.

One of its objects is to provide a process of manufacturing nitrogenous cellulose derivatives. Another object is the nitrogenous cellulose derivatives. Further objects will be seen from the detailed specification following hereafter.

This invention is based on the observation that by the simultaneous action of epichlorhydrin and ammonia or an ammonia derivative on cellulose in the presence of alkali, there are formed under surprisingly mild conditions, nitrogenous cellulose derivatives, the nitrogen content of which can easily amount to several per cent. It is known practice to cause epichlorhydrin to act on alkali cellulose. By treating with ammonia the product of the reaction of epichlorhydrin with alkali cellulose, however, it is not possible to produce a cellulose derivative containing nitrogen. Furthermore, it is known practice to cause halogen-alkylamines or halogen-aralkylamines to react with alkali cellulose. This process, however, has nothing to do with the simultaneous action of epichlorhydrin and an ammonia derivative on alkali cellulose.

As cellulose parent materials there may be used cotton, linters, wood cellulose, hydrated cellulose, for example in the form of artificial silk, staple fibre, films and the like; also mercerized cellulose from cotton or wood pulp, in short cellulose of any origin or pretreated in any manner.

As alkali there is preferably used caustic soda solution or caustic potash solution. It is not necessary that the alkali should have the concentration usual for a mercerization, for example a concentration of 18 per cent of NaOH, but even when caustic soda solution of 2 to 4 per cent. strength is used, products with considerable nitrogen content are obtained. An introduction of nitrogen into the molecule of the cellulose occurs with the use of any concentration of alkali. For the selection of the concentration of the alkali its action on the cellulosic material should be taken into account. The alkali concentration may be of considerable influence when treating artificial silk according to this invention inasmuch as the fibers may be deleteriously affected. The concentration of the alkali is preferably so selected that it corresponds with the action of a solution of caustic potash of 2 to 6 per cent. The cellulose material is impregnated with the alkali in the usual manner by immersion and, if desired, the pressed alkali-cellulose is disintegrated.

The action of the epichlorhydrin and the nitrogen derivative is best carried out at ordinary temperature in the form of vapour, while at the same time care must be taken to ensure uniform action by circulating the vapour phase or by moving the alkali cellulose. If as nitrogenous component there is used a non-volatile substance or a substance which is not sufficiently volatile, then this is incorporated with the alkali lye with which the cellulose material is treated. The treatment with the vaporous reagents may occur in a vacuum or even at ordinary pressure with or without exclusion of oxygen. The reagents may, however, be caused to act in solution on the pressed alkali cellulose, for instance in benzene solution.

As nitrogenous components there may be used ammonia, a primary, secondary or tertiary amine of an aliphatic, aromatic or mixed radical, a hydroxyalkylamine, an amino-acid, a heterocyclic base or a derivative of any of these.

The new cellulose derivatives retain their form in the reaction, for example, the fibrous form. After the excess alkali has been washed out, the products, according to the nitrogen content and the basicity of the nitrogen component, exhibit a more or less alkaline reaction. By acid wool dyestuffs they are dyed rapidly and fast; with dyestuffs which require a feebly acid medium for dyeing, they are dyed even more deeply than wool dyed in the same bath.

The following examples illustrate the invention:

Example 1.—500 grams of alkali-cellulose from sulfite cellulose and containing 29 per cent. of cellulose and 14 per cent. of NaOH are spread in a thin layer which is subjected to the action of 13 grams of $NH_3$ in an evacuated vessel of suitable dimensions at room temperature; after 2 hours 100 grams of epichlorhydrin are introduced into the vessel while avoiding direct wetting of the alkali cellulose. After standing for 18 hours at ordinary temperature, the epichlorhydrin disappears. The pure white product is washed with water, dilute sulfuric acid and again with water and dried. Its nitrogen content amounts to 1.58 per cent.

Example 2.—The process is the same as in Example 1, only instead of 100 grams of epichlorhydrin 200 grams thereof are used. The product contains 2.57 per cent. of nitrogen.

Example 3.—200 grams of linters are immersed for 3 hours in a steeping lye containing 18 per cent. of NaOH and 10 per cent. of glycocol in the form of the sodium salt. The alkali cellulose is pressed until it weighs about 700 grams, separated into fibres, and left to stand for 18 hours in a vacuum with 100 grams of epichlorhydrin.

After having been washed and dried, the product contains 0.63 per cent of nitrogen.

*Example 4.*—160 grams of mercerized and rewashed sulfite cellulose are immersed for 3 hours in 1500 grams of caustic soda solution of 18 per cent. strength containing 140 grams of hydroxyethylamine, and are then pressed until the weight is 540 grams. The product is subjected to the action of 100 grams of epichlorhydrin in the form of vapour in a vacuum. After having been washed, the product has a nitrogen content of 0.73 per cent.

*Example 5.*—160 grams of the same mercerized cellulose as in Example 4 are immersed for 3 hours in caustic soda solution of 18 per cent. strength containing 5 per cent. of anthranilic acid, pressed until they weigh 550 grams and separated into fibres. The alkali cellulose is subjected to the action of the vapour of 100 grams of epichlorhydrin in a vacuum; the washed and dried product contains 0.2 per cent. of nitrogen.

*Example 6.*—160 grams of the same cellulose as in the preceding example are immersed for 3 hours in a caustic soda solution of 2 per cent. strength, pressed to a weight of 500 grams and separated into fibres. The alkalated cellulose is subjected to the action of the vapour of 13 grams of ammonia and 100 grams of epichlorhydrin for 20 hours in a vacuum. The washed and dried product contains 0.9 per cent. of nitrogen.

*Example 7.*—The process is carried out as in the preceding example, but with caustic soda solution of 4 per cent. strength instead of 2 per cent. strength. The product contains 1.76 per cent. of nitrogen.

*Example 8.*—The process is carried out as in Example 6 but with caustic soda solution of 8 per cent. strength instead of 2 per cent. strength. The product contains 2.15 per cent. of nitrogen.

*Example 9.*—160 grams of viscose staple fibre are immersed for 3 hours in caustic potash solution of 2.8 per cent. strength and centrifuged to a weight of 470 grams, separated into fibres and subjected for 18 hours in a vacuum to the vapour of 13 grams of ammonia and 100 grams of epichlorhydrin. After having been washed and dried the product contains 0.92 per cent of nitrogen.

*Example 10.*—The process is carried out as in Example 9 but with caustic potash solution of 8.4 per cent strength. The product contains 2.65 per cent. of nitrogen.

*Example 11.*—160 grams of viscose staple fibre are immersed in caustic soda solution of 4 per cent. strength, pressed to weigh 510 grams, separated into fibres and subjected in a vacuum to 13 grams of ammonia and 100 grams of epichlorhydrin. The product contains 1.93 per cent. of nitrogen.

*Example 12.*—A cotton hank weighing 20 grams is immersed for 3 hours in caustic soda solution of 18 per cent. strength and centrifuged to a weight of 63 grams. The hank is subjected for 18 hours in a vacuum to the action of 21 grams of ammonia and 10 grams of epichlorhydrin, then washed with water, dilute acetic acid and again with water. The cotton yarn, which has become pure white, contains 1.08 per cent. of nitrogen.

*Example 13.*—A cotton yarn hank weighing 20 grams is immersed in caustic soda solution of 18 per cent. strength containing 8.3 per cent. of hydroxyethylamine, and centrifuged to weigh 68 grams. The hank is subjected for 20 hours in a vacuum to the vapour of 13.5 grams of epichlorhydrin. After having been washed and dried the cotton contains 0.78 per cent. of nitrogen.

*Example 14.*—160 grams of the same cellulose as in Example 4 are immersed in 1500 grams of caustic soda solution of 18 per cent. strength containing 8.3 per cent. of hydroxyethylamine and pressed to 580 grams, separated into fibres, and are then subjected to vapour of 100 grams of epichlorhydrin at ordinary pressure in a closed vessel. After 50 hours the epichlorhydrin is completely consumed. The product contains 0.68 per cent. of nitrogen.

*Example 15.*—160 grams of viscose staple fibre are immersed in caustic potash solution of 4 per cent. strength, centrifuged to 410 grams, separated into fibres, and subjected in a vacuum to vapour of 13 grams of ammonia, during which operation heat is developed. After cooling to room temperature, a solution of 100 grams of epichlorhydrin in 2.5 liters of benzene is sucked in, and the mixture is allowed to stand for 18 hours. The benzene is removed by pressure and suction and then, as in the preceding examples, washing and drying follow. The product has a nitrogen content of 1.19 per cent. Carbon tetrachloride may be used instead of benzene.

All percentages mentioned are percentages by weight.

What I claim is:

1. A process of producing cellulose derivatives containing nitrogen which comprises subjecting a cellulosic material in the presence of an aqueous alkaline liquid of at least 2 per cent strength simultaneously to the action of epichlorhydrin and a compound selected from the group consisting of ammonia and ammonia derivatives, the reaction being carried out at about room temperature.

2. A process of producing cellulose derivatives containing nitrogen which comprises subjecting a cellulosic material in the presence of an aqueous alkaline liquid of at least 2 per cent strength simultaneously to the action of epichlorhydrin and a compound selected from the group consisting of ammonia and ammonia derivatives, at least one component of reaction being present in gaseous condition, said reaction being carried out at about room temperature.

3. A process of producing cellulose derivatives containing nitrogen, which comprises subjecting a cellulosic material to the action of a solution of a caustic alkali of at least 2 per cent strength containing a compound selected from the group consisting of ammonia and ammonia derivatives, and treating the resulting product with epichlorhydrin at about room temperature.

4. A process of producing cellulose derivatives containing nitrogen, which comprises subjecting a cellulosic material to the action of a solution of a caustic alkali of at least 2 per cent strength containing a compound selected from the group consisting of ammonia and ammonia derivatives, and treating the resulting product at about room temperature with epichlorhydrin dissolved in a solvent which does not react with epichlorhydrin.

5. A process of producing cellulose derivatives containing nitrogen which comprises subjecting a cellulosic material to the action of a solution of a caustic alkali of at least 2 per cent. strength containing a compound selected from the group consisting of ammonia and ammonia derivatives, and treating the resulting product at about room temperature with epichlorhydrin in gaseous condition.

6. A process of producing cellulose derivatives containing nitrogen which comprises treating at room temperature alkali cellulose from sulfite pulp with ammonia in gaseous condition and then with epichlorhydrin in gaseous condition.

7. A process of producing cellulose derivatives containing nitrogen which comprises treating a hank of cotton yarn with a solution of caustic soda of 18% strength containing hydroxyethylamine, removing an excess of liquid, and subjecting the resulting product to the action of gaseous epichlorhydrin at about room temperature.

RICHARD STAHN.